(No Model.) 5 Sheets—Sheet 1.
J. T. CULLENS.
BRICK KILN.
No. 572,474. Patented Dec. 1, 1896.
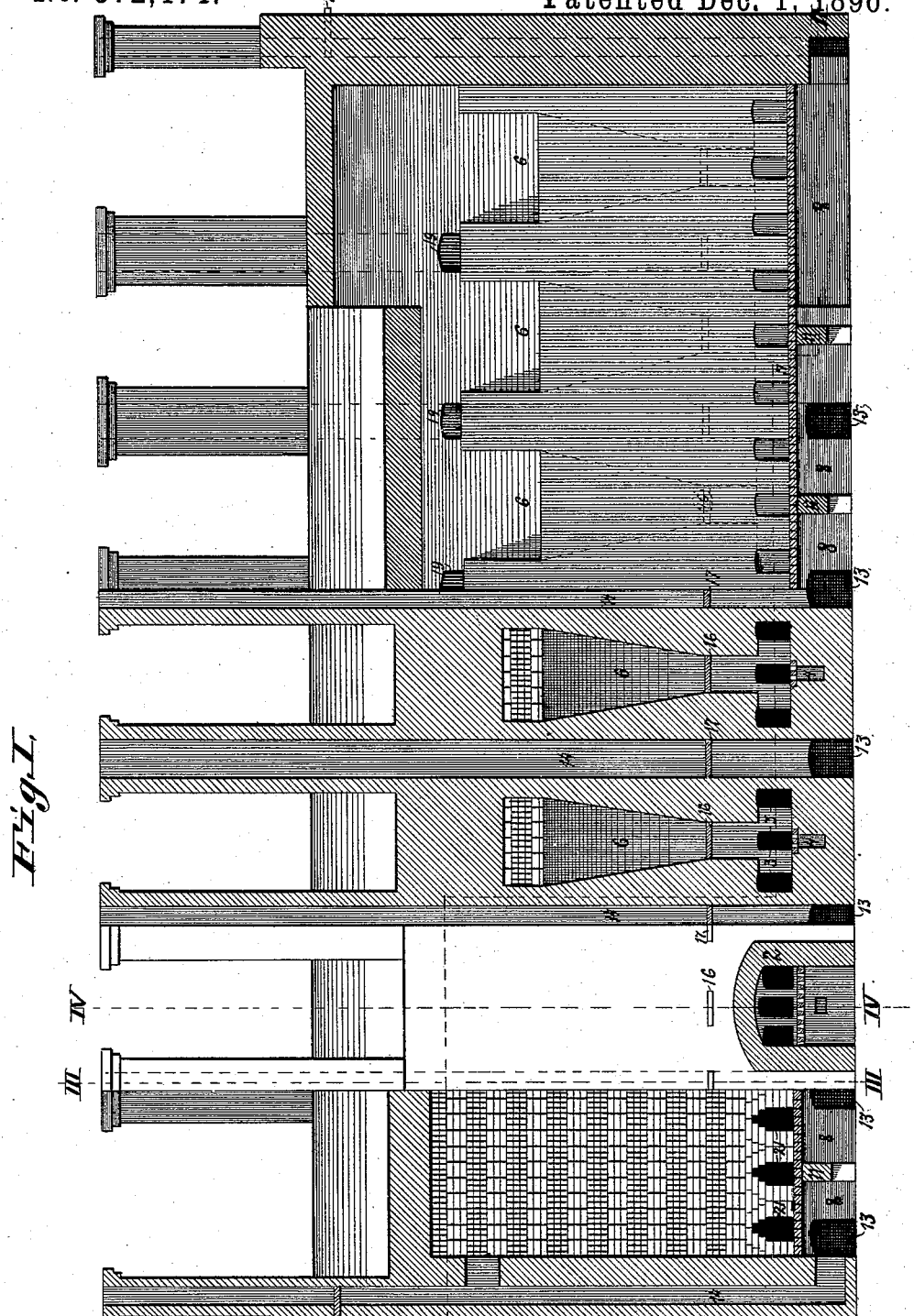
Fig. I.
Attest,
Halcolm G. Ellis
A. M. Ebersole
Inventor,
John T. Cullens.
By Knight Bros.
atty's.

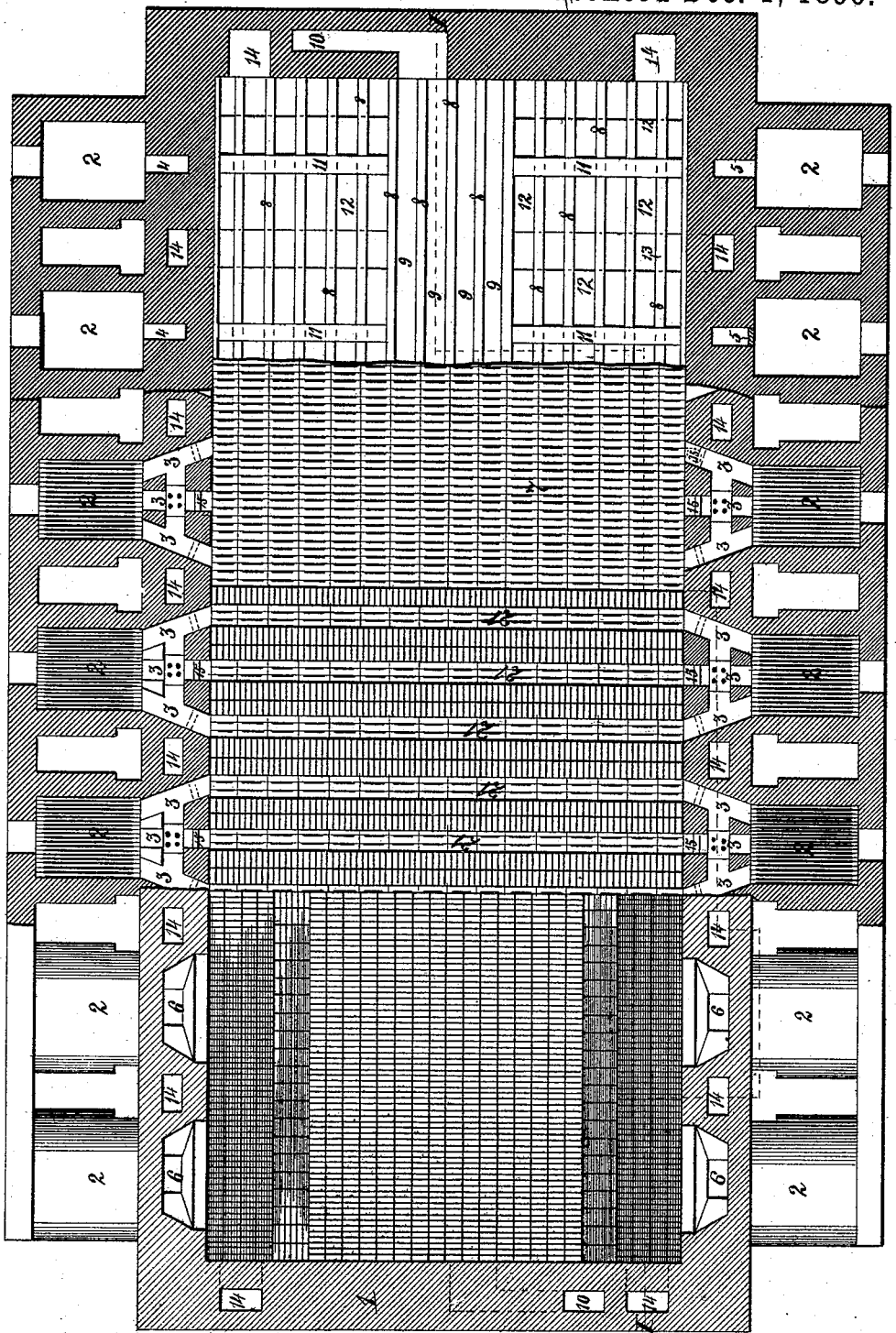

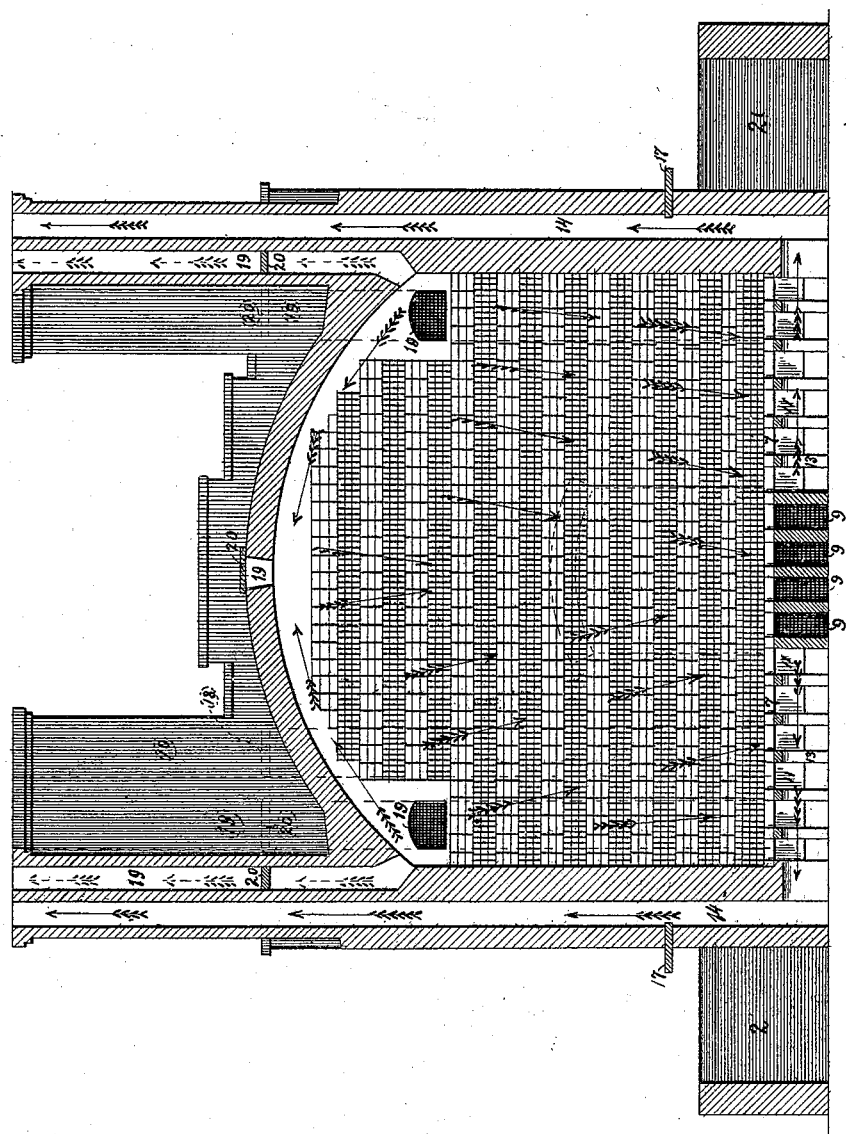

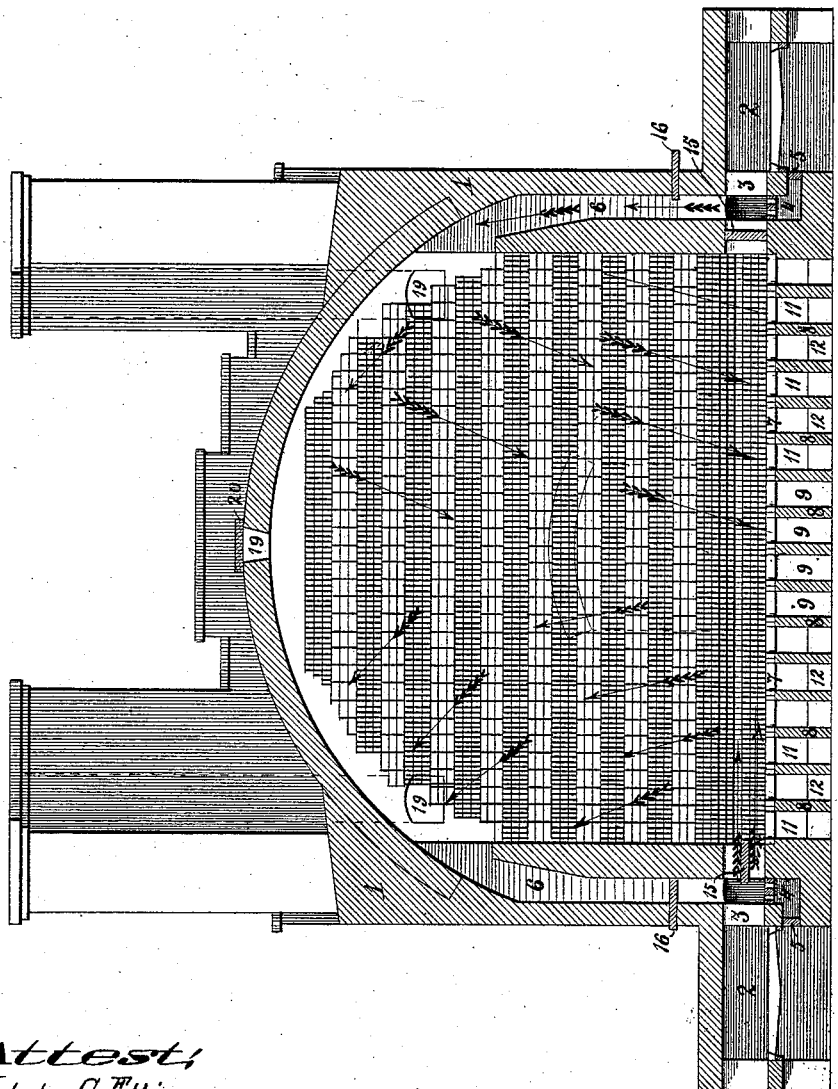

(No Model.)  
5 Sheets—Sheet 5.
J. T. CULLENS.
BRICK KILN.
No. 572,474.  
Patented Dec. 1, 1896.
Fig. V.
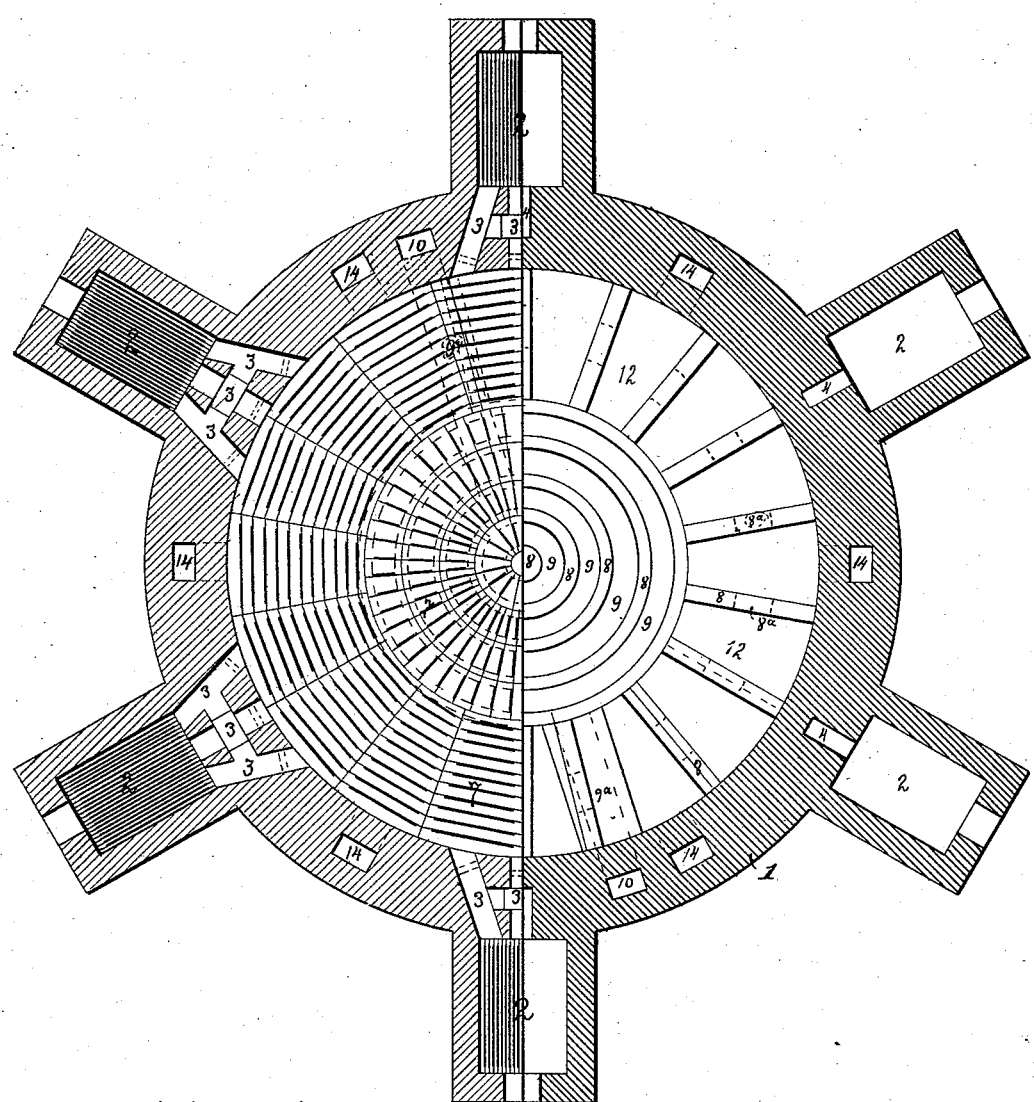
Attest:  
Halcolm G. Ellis  
A. M. Ebersole,
Inventor:  
John T. Cullens.  
By Knight Bros.  
atty's.

UNITED STATES PATENT OFFICE.

JOHN T. CULLENS, OF EDWARDSVILLE, ILLINOIS, ASSIGNOR OF TWO-THIRDS TO JOHN J. COLDIRON AND JAMES WALTER WOOTEN, OF SAME PLACE.

BRICK-KILN.

SPECIFICATION forming part of Letters Patent No. 572,474, dated December 1, 1896.

Application filed May 28, 1894. Serial No. 512,587. (No model.)

*To all whom it may concern:*

Be it known that I, JOHN T. CULLENS, of Edwardsville, in the county of Highland and State of Illinois, have invented a certain new and useful Improvement in Brick-Kilns, of which the following is a full, clear, and exact description, reference being had to the accompanying drawings, forming part of this specification.

This invention relates to that class of brick-kilns which have arrangements within them for using either an up or down draft.

The object of this invention is to provide means for regulating the heat and most efficiently directing the products of combustion from any of the furnaces of the kiln to any portion of the interior of the kiln.

My invention consists in features of novelty hereinafter fully described, and pointed out in the claim.

Figure I is a vertical section of the kiln, taken longitudinally upon the irregular line I I of Fig. II. Fig. II is a horizontal section taken upon the irregular line II II of Fig. I. Fig. III is a vertical cross-section on line III III of Fig. I. Fig. IV is a vertical cross-section on line IV IV of Fig. I. Fig. V is a horizontal section of a modification of this kiln, showing it in a circular form.

Referring to the drawings, 1 is the outer wall of the kiln, built in the usual way.

2 are the furnaces, also built in the usual way. There may be a series of these on one side only, or on both sides, as may best suit the convenience of the user.

From the furnaces there are three direct leads 3 into the interior of the kiln. These direct leads diverge as they pass through the wall 1, so that their openings on the interior of the wall are about equidistant apart. This is for the equal distribution of the products of combustion to the interior of the kiln. Beneath the center lead of each furnace there is an air-vent 4, having perforations opening into the lead 3. These air-vents are provided with a damper 5. A vertical fire-bag 6 communicates within the wall 1 with the three leads 3 and extends up and opens into the upper part of the kiln, widening laterally as it ascends.

7 is a perforated tile flooring of the kiln, resting upon walls 8 beneath. These walls 8 are arranged parallel to each other and extend the entire length of the kiln, forming between them flues. The four center flues 9 are uninterrupted from one end of the kiln to the other. Two of these flues open into a connection at one end with a chimney 10. The other two open into a similar chimney 10 at the other end of the kiln. Toward the side of the kiln there are cross-walls 11 to assist in supporting the perforated tile floor 7, and which divide the side flues 12 up into sections. These walls 11 do not extend clear to the level of the ground, but leave low openings between the adjacent flues 12. Through the walls 8, between the flues 12, there are arched openings 13, and opposite these arched openings 13 there is a communication in the wall 1 to a chimney 14. Each of these series of flues 12 embraced between any two of the walls 11 has a separate chimney 14 connecting with them.

Between the vertical fire-bags 6 and the interior of the kiln there is placed in each of the direct leads 3 a damper 15, and a damper 16 may open and close the vertical fire-bags 6. Each of the chimneys 14 is provided with a damper 17, and the chimneys 10, leading from the long center flues 9, are provided with dampers 18.

For use with the updraft the kiln is provided with a number of chimneys 19, leading from or near its top. Some of these chimneys are arranged on the sides between the openings of the fire-bags 6. There are also direct escapes through the center of the arched roof of the kiln, forming similar chimneys 19. These chimneys 19 are all provided with dampers 20.

When the kiln is charged, the green brick are arranged to form eyes 21, leading from one side of the kiln to the other and communicating at each end with each of the leads 3. This is to insure the most perfect circulation between the brick of the products of combustion.

The operation of this kiln is as follows: When it is desired to use the kiln with an updraft, the damper 16 in the fire-bags 6 are closed and the dampers 15 in the leads 3 are opened. The products of combustion pass into the eyes 21, and from there circulate up through the brick and escape through the chimneys 19, which of course must have their dampers 20 open. The object in providing a number of chimneys is that in case the fire on one side is in better condition than that on the other side or at any place along one of the sides the products of combustion may be directed to a more distant part of the kiln than the flues directly over this furnace by closing the dampers in the chimneys 19 nearest to the working furnace. In this way the direction of the products of combustion may be very easily regulated.

When it is desired to use the kiln with the downdraft, the dampers 15 in the direct leads 3 will be closed and the dampers 16 in the fire-bags 6 are opened. The products of combustion then pass up through the fire-bags 6 into the top of the kiln, and from there circulate down between the bricks, passing through the perforated floor 7 into the flues beneath the floor. Of course the dampers 20 of the chimneys 19 must be closed when this method of draft is used. The products of combustion pass into the center flues 9, and from there out through the chimneys 10 at the end of the kiln, and pass into the flues 12 and escape through the chimneys 14.

Whenever the furnaces are not working uniformly or from any other cause it is desired to direct the products of combustion from any furnace to a part of the kiln remote from such furnace, it is only necessary to close the dampers 17 in the flues 14 near such working furnace and open them in the flues 14 nearest the part of the kiln to which the products of combustion should be directed.

Since the cross-walls 11 do not extend clear down to the ground-line, the products of combustion may pass into one series of the flues 12, and if the damper in the escape-chimney 14 of that series is closed the heat will pass under the cross-wall 11 into the adjoining series of flues 12. This may be continued for the full length of the kiln, or until the heated gases find an escape through an open chimney 14. By this system of chimneys, in connection with the system of flues arranged beneath the perforated flooring 7, the heat from any particular furnace may be directed to any part of the kiln desired, assuring the most uniform heating of the entire interior of the kiln, or allowing a particular part of the kiln to be raised to a higher temperature, if through any cause such an end may be desired.

Fig. V shows a modification of the general form of the kiln, this being a round kiln. The walls 8 beneath the perforated tile flooring 7 are arranged in the form of four concentric rings around the center of the kiln, thus forming four circular flues 9. The two outside flues 9 have a connecting-flue $9^a$, leading to a chimney 10, and the two inside flues 9 have a similar connecting-flue $9^a$, leading to another chimney 10, placed on the opposite side of the kiln.

From the outside circular wall 8 radial walls $8^a$ extend to the wall 1 of the kiln. These walls $8^a$ each have an arched opening through them, and the spaces between these radial walls $8^a$ correspond to the flues 12 in the other form of construction. Every third flue 12 is provided with an opening to a chimney 14.

The construction of the furnaces 2 with the direct leads 3 and the fire-bags 6 is the same in every respect as in the rectangular form of kiln.

The operation and regulation of the round kiln are practically the same as that of the rectangular form, the only essential difference being the arrangement of the flues 9 and 12 beneath the perforated tile flooring 7.

I claim as my invention—

The combination in a brick-kiln, of the plurality of direct leads from the furnace to the interior of the kiln, the openings being approximately equidistant apart, dampers in the said direct leads, the fire-bags 6 expanded at their tops, and provided with dampers, a plurality of chimneys opening from the upper part of the kiln, and provided with dampers and a plurality of chimneys provided with dampers leading from flues under the perforated floor of the kiln; substantially as described.

JOHN T. CULLENS.

In presence of—
E. S. KNIGHT,
A. M. EBERSOLE.